United States Patent
Sakata

(10) Patent No.: US 6,402,155 B2
(45) Date of Patent: Jun. 11, 2002

(54) SEALING GROMMET, AND METHODS OF ASSEMBLING SAID GROMMET AND FORMING A WATERPROOF SEAL BETWEEN WIRES OF A WIRE HARNESS WITHIN SAID GROMMET

(75) Inventor: Tsutomu Sakata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/759,172

(22) Filed: Jan. 16, 2001

(30) Foreign Application Priority Data

Jan. 17, 2000 (JP) .......................... 2000-007565

(51) Int. Cl.[7] .................. F16L 5/00; H01B 17/30
(52) U.S. Cl. ............... 277/314; 277/316; 277/605; 277/606; 174/152 G; 174/153 G; 16/2.2
(58) Field of Search ................. 277/314, 316, 277/602, 605, 606, 627, 904; 174/31 R, 65 G, 152 G, 153 G, 151; 16/2.2, 2.3

(56) References Cited

U.S. PATENT DOCUMENTS

| 3,755,615 A | * | 8/1973 | Paullus et al. |
| 5,270,487 A |   | 12/1993 | Sawamura |
| 5,499,823 A | * | 3/1996 | Fukui |
| 5,526,549 A |   | 6/1996 | Mori et al. |
| 5,635,678 A |   | 6/1997 | Yasukuni |
| 5,981,877 A |   | 11/1999 | Sakata et al. |

FOREIGN PATENT DOCUMENTS

| JP | 11232948 | 8/1999 |
| JP | 11248044 | 9/1999 |

* cited by examiner

Primary Examiner—Anthony Knight
Assistant Examiner—John L. Beres
(74) Attorney, Agent, or Firm—Greenblum & Bernstein, P.L.C.

(57) ABSTRACT

A sealing grommet is provided that includes a grommet body with a sealant reservoir and a sealant drain portion. The grommet body has an outer peripheral wall, a panel engagement recess formed on the outer peripheral surface of the outer peripheral wall, and an inner peripheral wall extending inwardly of the outer peripheral wall and defining a wire harness insertion aperture inwardly thereof. The sealant reservoir is provided between the inner and outer peripheral walls, and is configured to temporarily store a sealant therein. The sealant drain portion is provided on the inner peripheral wall, and is configured to open upon deformation of the grommet body, thereby permitting the sealant to drain into the wire harness insertion aperture from the reservoir. With the above construction, the sealant can easily permeate between wires of the wire harness provided within the wire harness insertion aperture. Additionally, because the need for a sealant injection nozzle can be eliminated, a waterproof sealing operation can easily be carried out, even if the size of the sealing grommet is small.

20 Claims, 7 Drawing Sheets

Fig.6
PRIOR ART
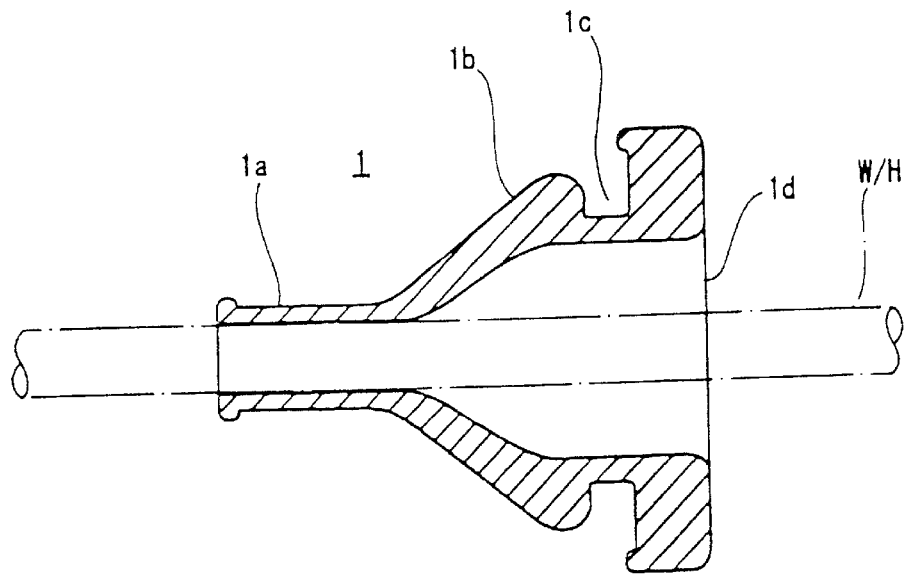
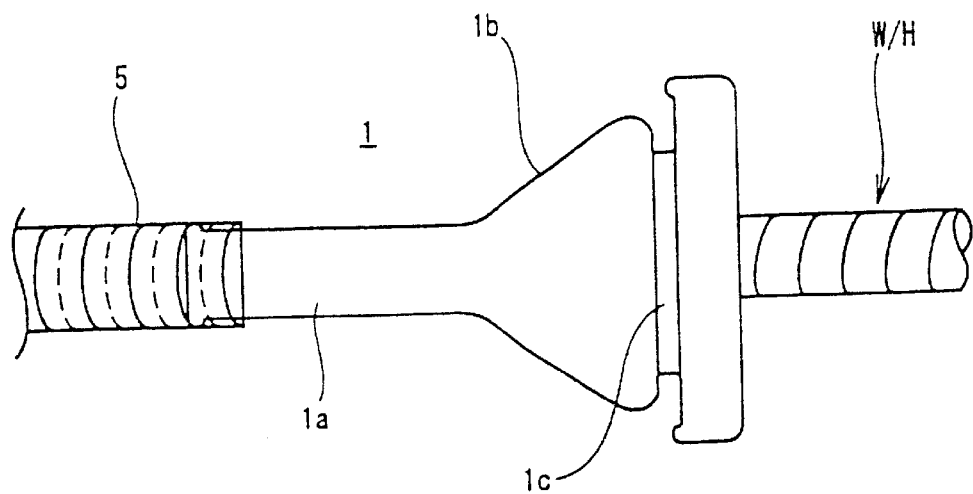
Fig.7
PRIOR ART

Fig.8(A)
PRIOR ART
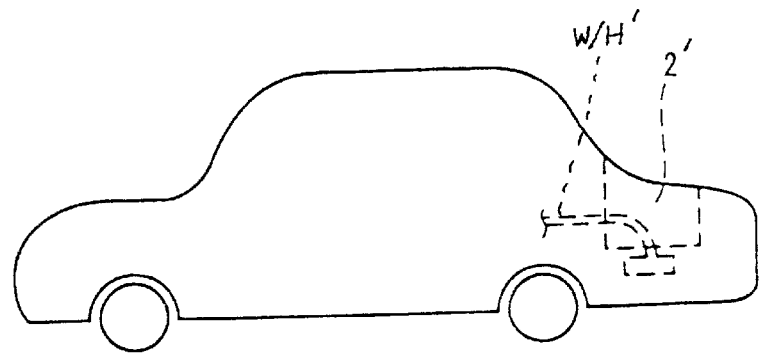
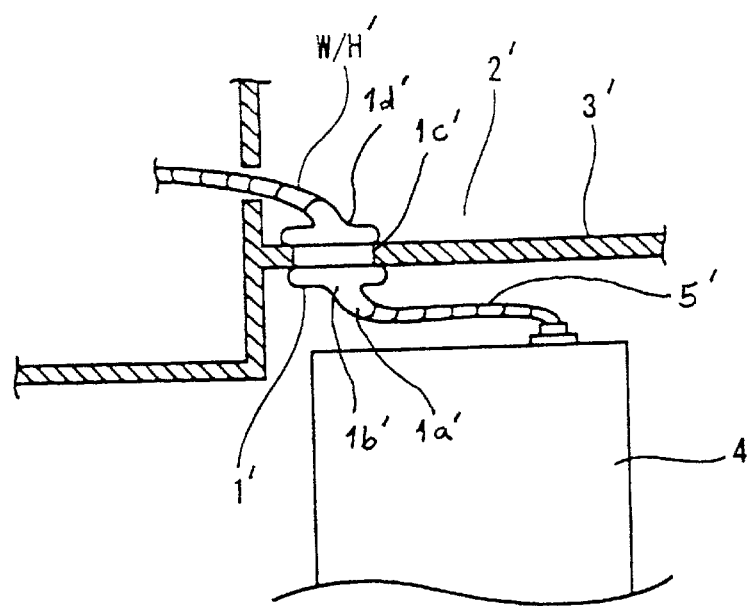
Fig.8(B)
PRIOR ART

SEALING GROMMET, AND METHODS OF ASSEMBLING SAID GROMMET AND FORMING A WATERPROOF SEAL BETWEEN WIRES OF A WIRE HARNESS WITHIN SAID GROMMET

BACKGROUND OF THE INVENTION

1. Field of the Invention

The present invention relates to a sealing grommet which holds a wire harness and which is mounted in the through hole of a vehicle panel; and to methods of assembling the sealing grommet, and of forming a waterproof seal within the grommet. The present invention is particularly applicable to a sealing grommet suitable for use with a small diameter wire harness which is produced by a small number of wires, but is clearly not limited thereto and could be applied to many other situations.

2. Background of the Invention

A grommet, formed, for example, from rubber or elastomer, holds a wire harness that extends from a compartment to the exterior of the compartment through a through hole of a vehicle panel. The grommet is fixedly mounted in the through hole to prevent water, etc. from penetrating the compartment through the panel.

A conventional grommet 1, 1' of this kind as shown in FIGS. 6, 7, 8(A) and (B) is provided with a small diameter tubular portion 1a, 1a' which tightly holds a group of wires and an enlarged diameter tubular portion 1b, 1b' which continues in a conical tube shape from one end of the small diameter tubular portion 1a, 1a'. A panel engagement recess 1c, 1c' is formed on the outer peripheral surface of the enlarged diameter tubular portion 1b, 1b'.

As shown in FIGS. 6 and 7, the grommet 1 of this kind (Hereinafter referred to as an engine harness grommet) is generally mounted on an engine compartment wire harness W/H that extends through the through hole on a firewall between engine and passenger compartments. However, as shown in FIGS. 8(A) and (B), a grommet 1'of this kind (Hereinafter referred to as a floor harness grommet) may also be mounted on a floor wire harness W/H' that, for example, extends to the mounting area of a fuel tank 4 at the rear of a vehicle, through a lower panel 3 in a luggage compartment 2. The floor wire harness W/H' has a group of wires that supply electric power to electrical loads such as a fuel pump and a license lamp. However, since the floor wire harness W/H' requires only a limited number of wires, i.e., 5 to 6 wires at maximum, it is smaller in diameter than the engine harness W/H. Accordingly, the floor harness grommet 1' is equally smaller in size than the engine harness grommet 1.

In order to prevent water from penetrating into the luggage compartment, a tape 5' is doubly wound on a region outside the luggage compartment from the small diameter portion 1a' of the grommet 1' to the floor wire harness W/H', in the same manner as shown in FIG. 7. However, mere double winding of the tape 5' does not prevent the ingress of water completely because water may permeate through the gaps between the individual wires of the floor wire harness W/H', as well as the gap between the inner surface of the tape 5' and the outer surface of the wire harness W/H'.

To improve waterproofing reliability, a sealant can be provided to form a seal between the wires, and, for example, it is known to provide such a sealant (not shown) in the engine harness grommet 1. In this case, the sealant is introduced into the front end opening 1c of the enlarged diameter tubular portion 1b, using a sealant injection nozzle (not shown). However, as described above, since the floor harness grommet 1' is smaller than the engine harness grommet 1, the front end opening 1d' of the floor harness grommet 1', into which the sealant is to be injected by use of the nozzle, is equally smaller than that of the engine harness grommet 1. Consequently, the injection nozzle (not shown) would interfere with the front end opening 1d' of the floor harness grommet 1' when the sealant is to be injected. Thus, it would be very difficult to fill the sealant into the floor harness grommet 1', by inserting the injection nozzle in the conventional manner.

SUMMARY OF THE INVENTION

The present invention has been developed after taking the above problems into consideration, and aims to provide a sealing grommet having a construction such that a waterproof seal can be formed between wires of a wire harness with ease and certainty. The present invention further aims to provide methods of assembling the sealing grommet and of forming the waterproof seal.

To solve the above problems, the present invention provides a sealing grommet that includes a grommet body having a sealant reservoir and a sealant drain portion. Specifically, the grommet body includes: an outer peripheral wall; a panel engagement recess formed on the outer surface of the outer peripheral wall and configured for hooking engagement with an aperture of a panel; and an inner peripheral wall extending inwardly of the outer peripheral wall and defining a wire harness insertion aperture inwardly thereof. The sealant reservoir is provided between the inner and outer peripheral walls, and is configured to temporarily store a sealant therein. The drain portion is provided on the inner peripheral wall, and is configured to open upon deformation of the grommet body, thereby permitting the sealant to drain into the wire harness insertion aperture from the reservoir.

With this construction, the sealant can easily permeate between wires of a wire harness within the harness insertion aperture after the drain portion opens. Furthermore, because the need for a sealant injection nozzle can be eliminated, a waterproof sealing operation can be carried out without any difficulties, even if the size of the sealing grommet is small.

According to a preferred embodiment of the present invention, the drain portion is configured to be frangible. Thus, it can be ripped open upon deformation of the grommet body.

In another aspect of the present invention, the grommet body further has a drain actuator portion configured for opening the drain portion upon operation thereof. Thus, the drain portion can be opened effectively. According to another preferred embodiment, the drain actuator portion is in the form of a handle portion that is configured to be readily gripped by the operator and pulled to open the drain portion. Moreover, the handle portion is provided on the inner peripheral wall, and is configured to project into the wire insertion aperture prior to the insertion of the wire harness and to project outwardly of the grommet body after the insertion of the wire harness. Also, the handle portion is positioned in proximity to an opening side where the wire harness extends outwardly from the harness insertion aperture, thereby permitting the handle portion to easily project out of the opening side and to be readily gripped and pulled until the drain portion opens.

Preferably, the drain portion has a frangible thin wall portion configured to be ripped open when the handle portion is pulled away. According to another preferred embodiment, the thin wall portion is formed into a generally V-shaped groove. The thin wall portion may be spaced apart a predetermined distance from the handle portion, and positioned at a location farther away from the opening side than the handle portion.

In a further aspect of the present invention, the outer peripheral wall of the grommet body has a small diameter tubular portion and an enlarged diameter tubular portion that continues in a conical tube shape from a first joined portion of the small diameter tubular portion. The panel engagement recess is formed on the outer surface of the enlarged diameter tubular portion, and the sealant reservoir is formed between an inner peripheral wall and the enlarged diameter tubular portion. Preferably, the inner peripheral wall and the small diameter tubular portion extend substantially concentrically to form double tubular portions, and are configured for releasable engagement with each other. According to a preferred embodiment, the small diameter tubular portion and the inner peripheral wall are separably engaged prior to injection of the sealant, and are permanently fixed together at an engagement area after the injection of the sealant. Accordingly, the sealant reservoir can be sealed effectively to prevent curing of the sealant within the reservoir.

In a further aspect of the present invention, the inner peripheral wall has a foldable tubular portion extending outwardly from a second joined portion of the enlarged diameter tubular portion. The foldable tubular portion can be folded inwardly at a folding-back portion adjacent the second joined portion, and can be extended interiorly of the outer peripheral wall. As a result, the sealant reservoir and the harness insertion aperture can be formed substantially concentrically with respect to the foldable tubular portion. In the sealant reservoir, the sealant is temporarily stored until the drain portion is opened.

Further, the present invention provides a method of assembling the above sealing grommet. First, the foldable tubular portion is folded inwardly at the folding-back portion, and extends interiorly of the enlarged diameter and the small diameter tubular portions so that the foldable tubular portion releasably engages with an inner peripheral surface of the small diameter tubular portion. As a result, the sealant reservoir is formed between the foldable tubular portion and the enlarged diameter tubular portion, with the harness insertion aperture formed inwardly of the foldable tubular portion. Next, the foldable tubular and the small diameter tubular portions are separated to form a sealant injection opening therebetween, and then the sealant is filled into the reservoir through the injection opening. Finally, the injection opening is closed, so that the reservoir can be sealed effectively to prevent curing of the sealant prior to drainage of the sealant into the harness insertion aperture. Therefore, the sealing grommet can be assembled effectively.

According to a preferred embodiment, the small diameter tubular portion is deformed or enlarged outwardly to form the sealant injection opening. Also, to close the opening, the small diameter tubular and the foldable tubular portions are bonded together at an engagement area.

Still further, the present invention provides a method of forming a waterproof seal between wires of a wire harness provided within a wire harness insertion aperture of the above sealing grommet. The sealant injection opening is formed between the small diameter tubular portion and the inner peripheral wall, and the sealant is injected into the reservoir in a similar manner as described above. The small diameter tubular portion and the inner peripheral wall are then permanently fixed so that the reservoir can be sealed effectively to prevent curing of the sealant within the sealant reservoir. After the small diameter tubular portion and the inner peripheral wall are fixed together, the wire harness is inserted through the harness insertion aperture, and a drain actuator portion provided on the inner peripheral wall is actuated, thereby opening the drain portion to permit the sealant to drain into the harness insertion aperture. This ensures that the sealant permeates between individual wires of the wire harness effectively, thereby forming the waterproof seal between the individual wires with certainty. Of course, in the event that the sealant filled grommet is to be used with a wire harness shortly after the sealant is provided in the sealant reservoir, i.e., before the sealant would normally cure without fixing the small diameter tubular portion to the inner peripheral wall, it would not be necessary to fix the small diameter tubular portion to the inner peripheral wall.

According to a preferred embodiment, the drain actuator portion includes a handle portion and the drain portion has a frangible thin portion. In this case, the handle portion projects outwardly of the grommet body after the insertion of the wire harness. Then, the handle portion is gripped and pulled in a direction away from the grommet body until the thin wall portion is ripped open to permit the sealant to drain into the harness insertion aperture. Should the sealant not flow into the aperture smoothly, the enlarged diameter tubular portion may be squeezed or deformed inwardly to facilitate the drainage of the sealant. This deformation operation can be done either manually or mechanically.

BRIEF DESCRIPTION OF THE DRAWINGS

The present invention is further detailed in the description which follows, in reference to the noted plurality of drawings by way of non-limiting examples of exemplary embodiments of the present invention, in which like reference numerals represent similar parts throughout the several views of the drawings, and wherein:

FIG. 6 is a sectional view showing a conventional grommet;

FIG. 7 is a schematic view showing the condition in which the conventional grommet of FIG. 6 is mounted on a wire harness; and FIGS. 8(A) and (B) are schematic views showing the examples of how another conventional grommet such as a floor harness grommet is mounted on a vehicle panel.

DETAILED DESCRIPTION OF PREFERRED EMBODIMENTS

The terms such as anterior, interior, etc. are used in this description to aid in understanding of the present invention. It should be understood that these terms are used in relation to the drawings as shown. It is fully envisioned that other orientations are possible and within the scope of the present invention.

As shown in FIGS. 8(A) and (B), a sealing grommet 10 of the present invention may be mounted on a floor wire harness that, for example, extends downwardly from the luggage compartment through a lower panel, and then secured within an aperture provided on the lower panel in a manner similar to that of grommet 1'.

Figure 1:
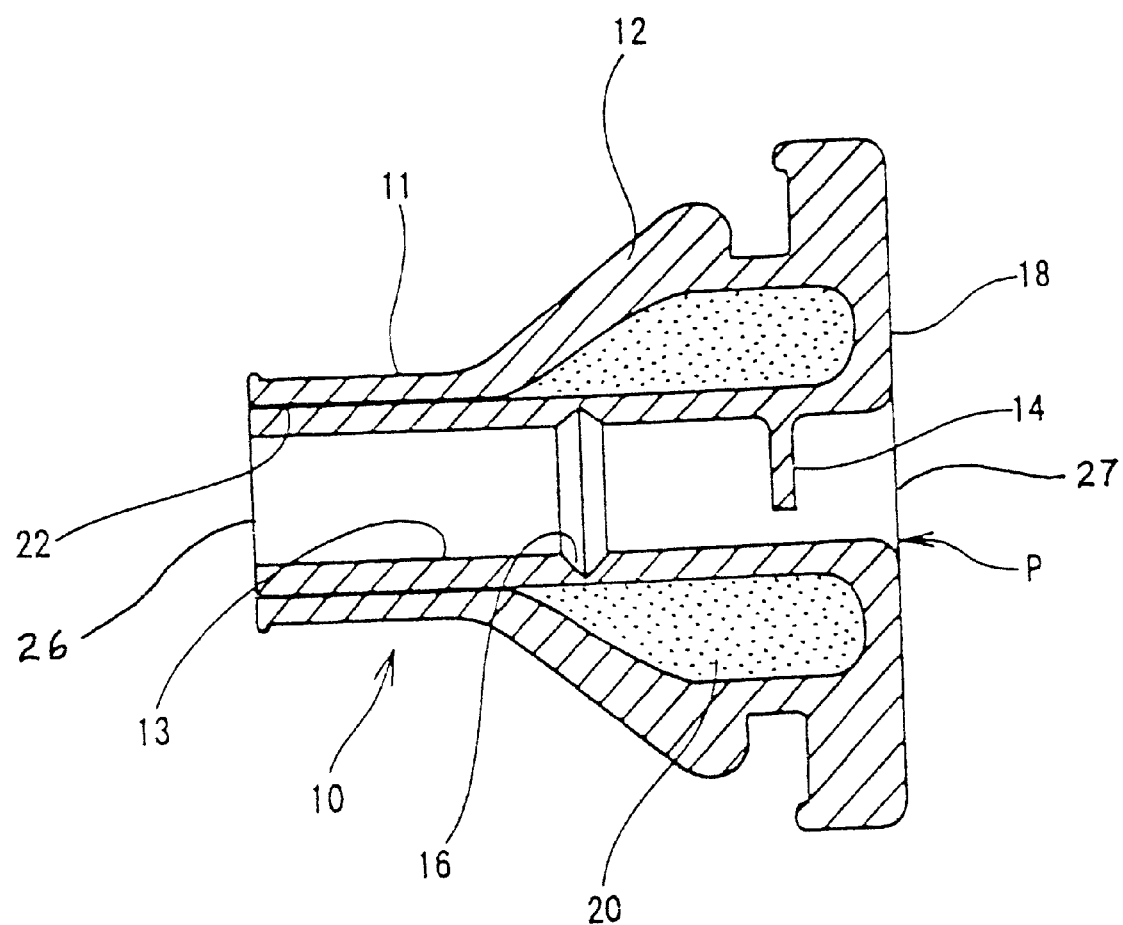
FIG. 1 is a sectional view of the sealing grommet according to the present invention.
Figure 2A:
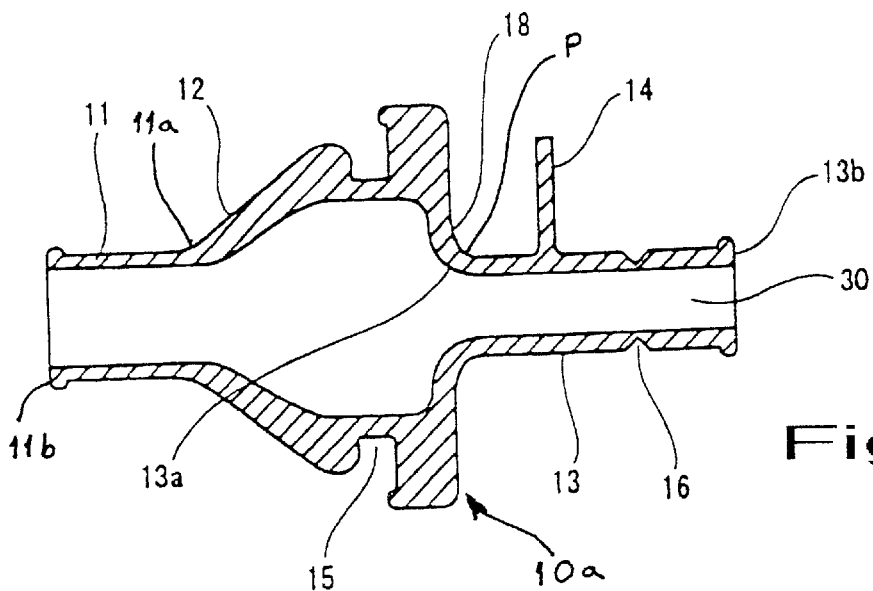
FIG. 2(A) is a sectional view showing a blank, i.e., the sealing grommet of the present invention in a molded pre-formed condition.
Figure 3:
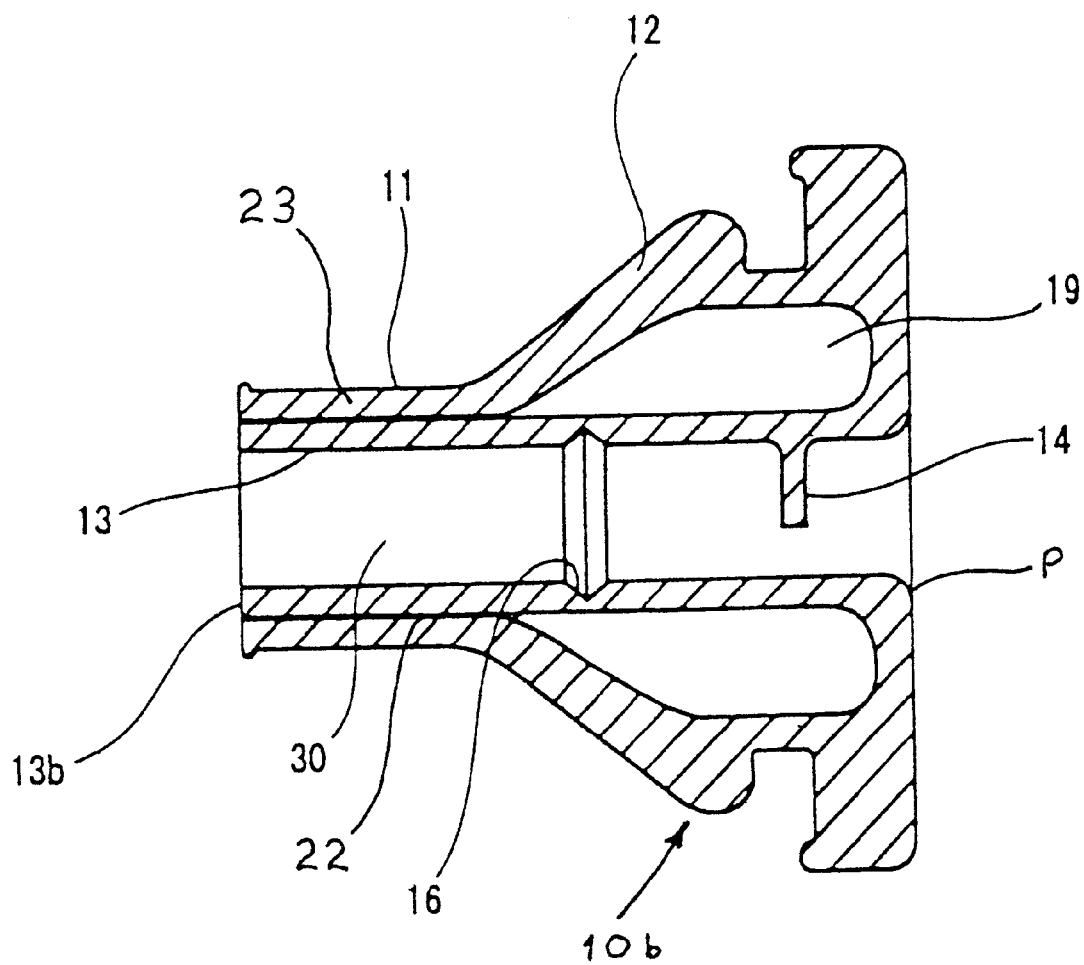
FIG. 3 is a sectional view showing a grommet body, i.e., the condition in which the blank of FIG. 2(A) is assembled to form the grommet body.
Figure 4:
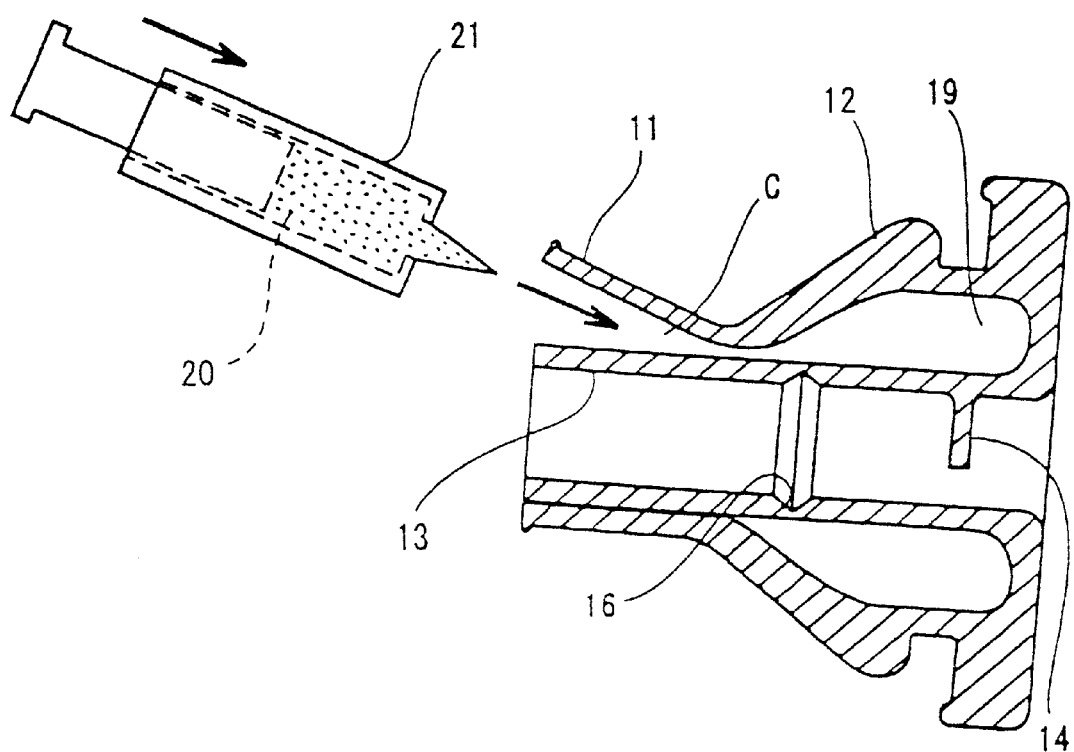
FIG. 4 is a sectional view showing the operation of filling a sealant into the grommet body of FIG. 3.

The grommet 10 has a construction as illustrated in FIG. 1, and is assembled in a manner as described below. First, as shown in FIG. 2(A), a blank 10a is molded, for example, from rubber or elastomer, and a foldable tubular portion 13 is folded back to form a grommet body 10b as shown in FIG. 3. Finally, as shown in FIG. 4, a sealant 20 is injected into the grommet body 10b.

Figure 2B:
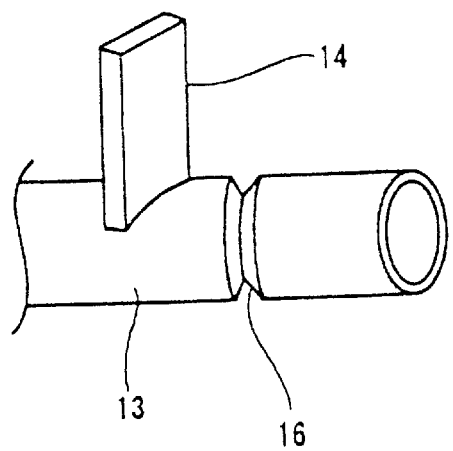
FIG. 2(B) is a perspective view showing the drain portion and the drain actuator portion of the sealing grommet according to the present invention.
Figure 2C:
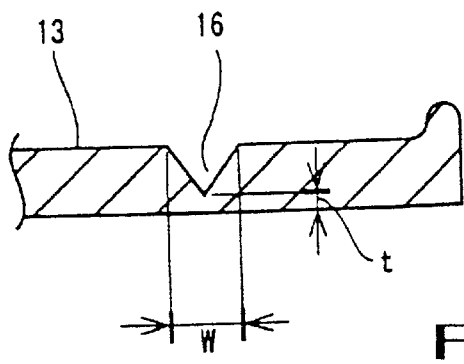
FIG. 2(C) is an enlarged, sectional view showing the drain portion of FIG. 2(B)

As best seen in FIG. 2(A), formed unitarily in one piece in a molded pre-assembled condition are: a small diameter tubular portion 11; an enlarged diameter tubular portion 12 which continues in a conical tube shape from a first joined portion 11a provided at one end of the small diameter tubular portion 11; the foldable tubular portion 13 which projects outwardly from a posterior surface of the enlarged diameter tubular portion 12; and a drain actuator portion 14 provided on an outer peripheral surface of the foldable tubular portion 13. In a preferred embodiment, the drain actuator portion 14 is in the form of a handle portion 14 that projects from the outer peripheral surface of the foldable tubular portion 13, preferably at a right angle as shown in FIG. 2(B). On the outer peripheral surface of the enlarged diameter tubular portion 12, a panel engaging recess 15 is provided for hooking engagement with the aperture of the panel. From the posterior surface of the enlarged diameter tubular portion 12, a second joined portion 18 or an annular projecting portion 18 projects inwardly so that a base end 13a of the foldable tubular portion 13 continues to extend from the inner peripheral surface of the projecting portion 18. Moreover, a sealant drain portion 16 is provided on the outer peripheral surface of the foldable tubular portion 13. In a preferred embodiment, the drain portion 16 is in the form of a frangible thin wall portion 16, and is positioned farther away from the base end 13a than the handle portion 14. As shown in FIG. 2(C), the thin wall portion 16 may be formed from a generally V-shaped groove 16. The V-shaped groove may be configured so as to extend about the entire periphery of the outer peripheral surface of the foldable tubular portion 13. Additionally, a folding-back portion P is provided at a location adjacent the base end 13a of the foldable tubular portion 13.

In a more preferred embodiment of the thin wall portion 16, the thickness of the thin wall portion 16 is set to be about 0.3 mm–0.1 mm. For example, in the most preferred embodiment as shown in FIG. 2(C), the thickness is set at 0.25 mm, and the width of the recess of the V-shaped groove 16 is at 0.5 mm. The thin wall portion 16 may not necessarily be limited to the configuration of the V-shape. Other suitable configurations such as a concave shape groove and a U-shape groove could also be employed, but the thickness should always be sufficient to permit easy breakage.

In the preferred embodiment, the above-described parts are unitarily formed in one piece. Alternatively, the drain actuator portion and the drain portion, in particular, can be formed separately in any suitable manner.

As shown in FIG. 3, the foldable tubular portion 13 is folded inwardly at the folding-back portion P, and extends interiorly of the enlarged diameter and the small diameter tubular portions 11, 12, thereby forming a space or sealant reservoir 19 between the foldable tubular and the enlarged diameter tubular portions 12, 13. When fully folded, the foldable tubular portion 13 releasably engages with an inner peripheral surface of the small diameter tubular portion 11, thereby forming double concentric tubular portions with the first and second ends 11b, 13b thereof aligned. Under this condition, the thin wall portion 16 of the foldable tubular portion 13 is positioned in proximity to the first joined portion 11a, and is positioned away from the folding back portion P. As illustrated, the handle portion 14 projects into a hollow portion or wire harness insertion aperture 30 through which the wire harness is insertable. The wire harness insertion aperture 30 is formed inwardly of the foldable tubular portion 13, and extends substantially concentrically with respect to the reservoir 19 which is formed outwardly of the foldable tubular portion 13.

Alternatively, the grommet body 10b may be formed in any suitable manner that would not require the folding back process. For example, an inner peripheral wall 13 can be provided to merely extend inwardly of the outer-diameter and the small diameter tubular portions 11, 12 in the form of an outer peripheral wall.

Referring to FIG. 4, after the condition of FIG. 3 is reached, the small diameter and the foldable tubular portions 11, 13 are separated while enlarging the small diameter tubular portion 11 outwardly. As a consequence, a sealant injection opening C is temporarily formed between the small diameter and the foldable tubular portions 11, 13. A sealant injector 21, for example, in the form of a syringe, is inserted into the injection opening C, and then the sealant 20 is injected into the reservoir 19. Since the sealant is temporarily stored in the reservoir 19 until the thin wall portion 16 is opened, preferred sealing materials are of relatively low viscosity and of relatively high flowability, and are capable of curing only when they absorb atmospheric moisture. Many adhesives, for example, cyanoacrylates and silicones may be suitable for the purpose of the present invention. An especially preferred sealing material is Alon-alpha, an instant adhesive available from Toagosei Co. Ltd. However, any suitable sealant material may be used.

After the introduction of the sealant 20 into the reservoir 19, the injector 21 is removed from the grommet 10, and then the foldable tubular portion 13 is permanently fixed with the small diameter tubular portion 11 at an engagement area 23. In a preferred embodiment, the small diameter and the foldable tubular portions 11, 13 are bonded at the engagement area 23, for example by an adhesive 22 such as a metamorphic isoprene adhesive. Due to the bonding of the tubular portions 11,13, the reservoir 19 can be sealed effectively to prevent curing of the sealant within the reservoir 19.

Also, other suitable bonding methods are applicable to bond the small diameter and the foldable tubular portions 11,13 together. For example, an unvulcanized rubber material may be applied on the engagement area 23, and heated later, so that the rubber material cures to bond the tubular portions 11, 13 together. If both the tubular portions 11, 13 are made of a thermoplastic elastomeric material, they may also be melt bonded.

As described above, in the preferred embodiment, the sealing grommet 10 of FIG. 1 can easily be assembled by filling the sealant 20 into the sealant reservoir 19, and then by bonding the small diameter and the foldable tubular portions 11,13.

Figure 5A:
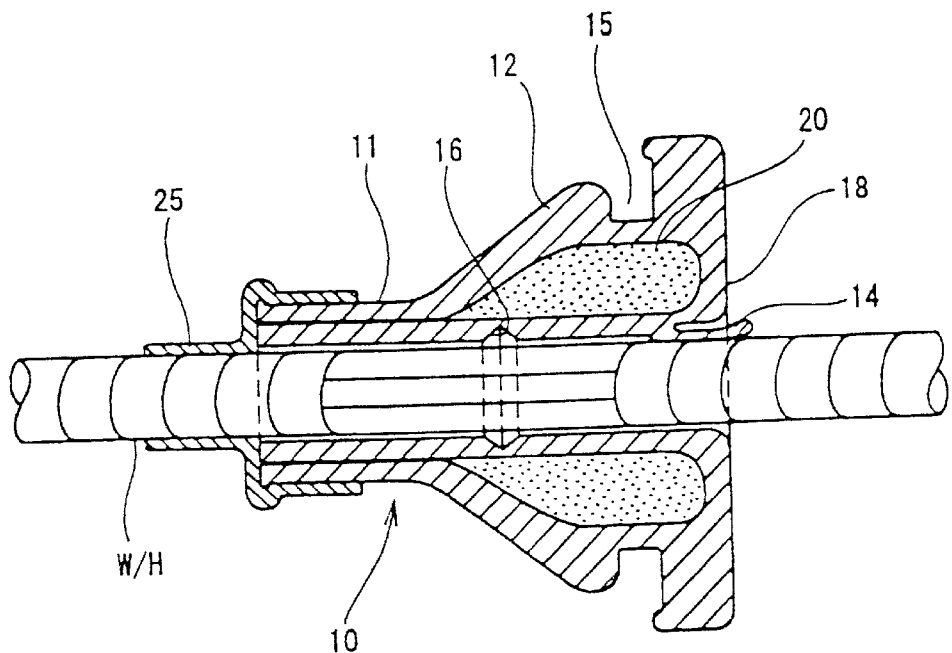
FIG. 5(A) is a sectional view showing the condition in which the sealing grommet of FIG. 1 is mounted on a wire harness.

As shown in FIGS. 5(A) and (B), once the grommet 10 is fully assembled, the wire harness W/H, which is produced by a small group of 5–6 wires at maximum, is first inserted through the wire harness insertion aperture 30. More specifically, the wire harness W/H is inserted from an anterior opening side 26 of the insertion aperture 30 (corresponding to the second opening 13b), and extends outwardly from a posterior opening side 27 located adjacent the folding-back portion P. The handle portion 14, which projects into the harness insertion aperture 30, needs to project out of the posterior opening side 27 after the insertion of the wire harness W/H. Accordingly, the handle portion 14 is positioned at a location where it can readily project outwardly without becoming tangled with the wire harness W/H during its insertion.

Figure 5B:
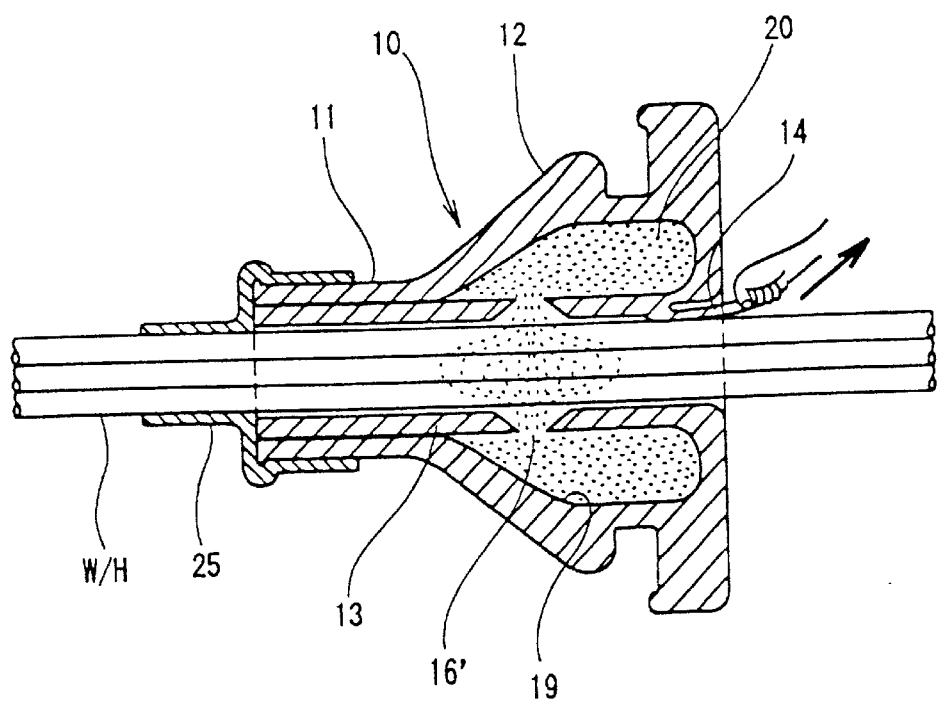
FIG. 5(B) is a sectional view showing the operations of opening the drain portion of FIG. 2(C) and draining the sealant.

Then, a tape 25 is doubly wound from the small diameter tubular portion 11 of the grommet 10 to the wire harness W/H. Afterward, the handle portion 14 is gripped and pulled strongly in a direction away from the grommet body 10b, thereby breaking or ripping open the thin wall portion 16 (FIG. 5(B)). At this juncture, the sealant 20 flows from the reservoir 19 into the insertion aperture 30 through a ripped open portion 16', thereby penetrating the gaps between the wires of the wire harness W/H provided within the wire harness insertion aperture 30. The sealant 20 then cures to form the waterproof seal after the elapse of a predetermined time. In this manner, the waterproof seal can be formed between the individual wires as well as between the outer surface of the wires and the inner surface of the foldable tubular portion 13.

Should the sealant 20 not flow out smoothly through the ripped open portion 16' of the thin wall portion 16, then the enlarged diameter tubular portion 12 of the grommet 10 can be squeezed or deformed inwardly to facilitate the drainage of the sealant 20.

With the construction of the above preferred embodiments, the sealant 20 can easily be introduced into the reservoir 10 using the injector 21 and is temporarily stored therein. Further, after the insertion of the wire harness W/H, the sealant 20 can permeate the gaps of the individual wires with certainty by breaking open the thin wall portion 16 while pulling the handle portion 14. Accordingly, a waterproof sealing operation can easily be carried out even if the size of the grommet 10 is small.

On the other hand, if a waterproof seal is also required at the small diameter tubular portion side, it is preferred to provide the thin wall portion 16 in proximity to that tubular portion side. Moreover, to break open the thin wall portion 16 with a relatively small pulling force, it is preferred to provide the handle portion 14 adjacent the thin wall portion 16. However, in the preferred embodiment, the handle portion 14 is positioned in proximity to the posterior opening side 27, spaced apart a desired distance from the thin wall portion 16. This arrangement forces the handle portion 14 to project out of the posterior opening side 27 after the insertion of the wire harness W/H. Additionally, the handle portion 14 may be positioned at a location adjacent the posterior opening side 27.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. HEI 2000-007565, filed on Jan. 17, 2000, which is herein expressly incorporated by reference in its entirety.

What is claimed is:

1. A sealing grommet comprising a grommet body having:
    an outer peripheral wall;
    a panel engagement recess provided on an outer peripheral surface of said outer peripheral wall for hooking engagement with an aperture of a panel;
    an inner peripheral wall extending inwardly of said outer peripheral wall and defining a wire harness insertion aperture inwardly thereof;
    a sealant reservoir formed between said inner and outer peripheral walls and configured to temporarily store a sealant therein; and
    a sealant drain portion provided on said inner peripheral wall, wherein said drain portion is configured to open upon deformation of said grommet body, so as to permit the sealant to drain into said wire harness insertion aperture from said reservoir, whereby the sealant can penetrate between wires of a wire harness provided within said wire harness insertion aperture.

2. The grommet according to claim 1, wherein said sealant drain portion is configured to be frangible, whereby said drain portion can be ripped open upon deformation of said grommet body.

3. The grommet according to claim 1, wherein said grommet body further comprises a drain actuator portion configured for opening said drain portion upon operation thereof.

4. The grommet according to claim 3, wherein said drain actuator portion comprises a handle portion that is configured to be gripped and pulled to open said drain portion.

5. The grommet according to claim 4, wherein said drain actuator portion is formed on said inner peripheral wall, wherein said handle portion is configured to project into said wire insertion aperture prior to insertion of the wire harness and to project outwardly of said grommet body after the insertion of the wire harness.

6. The grommet according to claim 5, wherein said drain actuator portion is positioned in proximity to an opening side where the wire harness extends outwardly from said wire harness insertion aperture.

7. The grommet according to claim 6, wherein said sealant drain portion is spaced apart a predetermined distance from said drain actuator portion, and is positioned at a location farther away from said opening side than said drain actuator portion.

8. The grommet according to claim 4, wherein said sealant drain portion comprises a frangible thin wall portion that is configured to be ripped open when said drain actuator portion is pulled away.

9. The grommet according to claim 8, wherein said sealant drain portion is configured as a generally V-shaped groove.

10. The grommet according to claim 1, wherein said outer peripheral wall comprises a small diameter tubular portion and an enlarged diameter tubular portion continuing in a conical tube shape from a first joined portion of said small diameter tubular portion, said panel engagement recess formed on an outer surface of said enlarged diameter tubular portion, wherein said sealant reservoir is formed between said inner peripheral wall and said enlarged diameter tubular portion.

11. The grommet according to claim 10, wherein said inner peripheral wall and said small diameter tubular portion extend substantially concentrically to form double tubular portions, and are configured for releasable engagement with each other.

12. The grommet according to claim 11, wherein said small diameter tubular portion and said inner peripheral wall are separably engaged prior to injection of the sealant, and are permanently fixed together at an engagement area after the injection of the sealant, whereby said reservoir can be sealed to prevent curing of the sealant prior to drainage of the sealant into said wire harness insertion aperture.

13. The grommet according to claim 10, wherein said inner peripheral wall comprises a foldable tubular portion extending outwardly from a second joined portion of said enlarged diameter tubular portion, wherein said foldable tubular portion is folded inwardly at a folding-back portion provided at a location adjacent said second joined portion, and is extended interiorly of said outer peripheral wall, whereby said sealant reservoir and said wire harness insertion aperture are formed substantially concentrically with respect to said foldable tubular portion.

14. The grommet according to claim 1, further comprising sealant temporarily stored in said reservoir until said drain portion is opened.

15. A method of assembling a one-piece sealing grommet, wherein the grommet according to claim 13 is used, said method comprising:

folding said foldable tubular portion inwardly at said folding-back portion;

extending said foldable tubular portion interiorly of said enlarged diameter and said small diameter tubular portions so that said foldable tubular portion releasably engages with an inner peripheral surface of said small diameter tubular portion, thereby forming said sealant reservoir between said foldable tubular portion and said enlarged diameter tubular portion and forming said wire harness insertion aperture inwardly of said foldable tubular portion;

separating said foldable tubular portion and said small diameter tubular portion to form a sealant injection opening therebetween;

filling sealant into said sealant reservoir through said sealant injection opening; and closing said sealant injection opening, whereby said sealant reservoir can be sealed to prevent curing of said sealant prior to drainage of said sealant into said wire harness insertion aperture.

16. The method of assembling a one-piece sealing grommet according to claim 15, said method comprising: enlarging said small diameter tubular portion outwardly from said foldable tubular portion so as to form said sealant injection opening.

17. The method of assembling a one-piece sealing grommet according to claim 16, said method comprising: bonding said small diameter tubular portion and said foldable tubular portion at an engagement area so as to close said sealant injection opening.

18. A method of forming a waterproof seal between wires of a wire harness provided within a wire harness insertion aperture of a sealing grommet, wherein the grommet according to claim 12 is used, said method comprising:

separating said small diameter tubular portion and said inner peripheral wall, thereby forming a sealant injection opening therebetween;

injecting sealant into said sealant reservoir through said sealant injection opening;

fixedly engaging said small diameter tubular portion and said inner peripheral wall at an engagement area, whereby said sealant reservoir can be sealed to prevent curing of said sealant prior to drainage of said sealant into said wire harness insertion aperture;

inserting a wire harness through said wire harness insertion aperture; and actuating a drain actuator portion provided on said inner peripheral wall, thereby opening said drain portion so as to permit said sealant to drain into said wire harness insertion aperture, whereby said sealant permeates between wires of said wire harness.

19. The method of forming a waterproof seal between wires of a wire harness provided within a wire harness insertion aperture of a sealing grommet according to claim 18, wherein said drain actuator portion comprises a handle portion and said drain portion comprises a frangible thin portion, said method comprising:

projecting said handle portion outwardly of said grommet body upon the insertion of said wire harness;

gripping and pulling said handle portion in a direction away from said grommet body;

breaking open said thin wall portion while pulling said handle portion, thereby permitting said sealant to drain into said wire harness insertion aperture.

20. The method of forming a waterproof seal between wires of a wire harness provided within a wire harness insertion aperture of a sealing grommet according to claim 19, further comprising deforming said enlarged diameter tubular portion inwardly to facilitate drainage of said sealant into said wire harness insertion aperture.

* * * * *